3,660,499
ARYL 3-IODOPROPARGYL FORMALS

Kanjiro Kobayashi, Nishinomiya, Takashi Uyama, Kobe, Hideo Suzuki, Amagasaki, and Hiroshi Shirai, Suita, Japan, assignors to Nagase & Co., Ltd., Osaka, Japan
No Drawing. Filed Mar. 3, 1970, Ser. No. 16,255
Claims priority, application Japan, Mar. 3, 1969, 44/16,355; May 7, 1969, 44/35,455
Int. Cl. C07c 43/30
U.S. Cl. 260—613 D 8 Claims

ABSTRACT OF THE DISCLOSURE

Iodized formal compounds of the formula $$ArOCH_2OCH_2C \equiv CI$$

wherein Ar is a phenyl, naphthyl or nitrogen-containing aromatic group substituted or not with alkyl, halogen or nitro group(s) are bactericidal and fungicidal agents.

---

This invention relates to novel iodized formal compounds, their production and use thereof as bactericidal and fungicidal agents.

The novel iodized formal compounds of this invention are represented by the following general formula:

$$ArOCH_2OCH_2 \equiv CI \qquad (I)$$

wherein Ar represents a phenyl, naphthyl or nitrogen-containing aromatic ring group substituted or not substituted with alkyl, halogen or nitro group(s).

According to this invention, the novel formal compounds of the Formula (I) are prepared by reacting a formal compound represented by the general formula:

$$ArOCH_2OCH_2C \equiv CH \qquad (II)$$

wherein Ar is as defined before, with an iodizing agent.

The iodized formal compounds of the Formula I are novel and have excellent bacteriocidal and fungicidal activity as explained hereinafter.

The formal compounds of the Formula II are also novel compounds and can be easily and substantially quantitatively prepared y reacting propargylchloromethyl ether with an alkali metal salt of a compound represented by the general formula ArOH (wherein Ar is as defined before) in an inert organic solevnt such as alcohols and ketones).

In carrying out the process of the present invention, a method generally known for the iodization of acetylene compounds may be employed. However, it is preferable to employ a hypoiodite as the iodizing agent because the operation is easy and the yield is high. It is also possible to prepare a copper acetylide of the formal of the Formula II and then to iodize the acetylide with iodine. However, this method has drawbacks that the operation is complicated and that the yield is somewhat low.

The iodization with a hypoiodite may be carried out by dissolving a formal compound of the Formula II in in organic solvent which is inert to the reaction and is miscible with water such as methanol or ethanol, and adding iodine thereto in the presence of an aqueous solution of an alkali metal hydroxide. The reaction temperature is preferably 5 to 15° C.

The invention will be further explained by referring to the following examples.

EXAMPLE 1

Paranitrophenylpropargyl formal (M.P. 73.5–74.5° C.) 4.7 g. were dissolved in a mixture of 70 cc. of methanol and 20 cc. of dioxane. Then 2 g. of caustic soda dissolved in 3 cc. of water were added thereto. Thereafter 5.7 g. of powdered iodine were added thereto over 30 minutes under stirring while keeping the solution at about 10° C. After the addition, the solution was stirred at the same temperature for 1 hour. Then 300 cc. of water were added and the precipitated crystals were recovered by filtration, washed with water, dried and then recrystallized from isopropyl alcohol to obtain paranitrophenyl 3-iodopropargyl formal (M.P. 114 to 115.5° C.) in the form of slightly yellow columnar crystals. The yield was 6.7 g.

EXAMPLE 2

22.6 g. of metacresylpropargyl formal (B.P. 70 to 75° C./0.3 mm. Hg) were dissolved in 200 cc. of methanol, and 11.3 g. of caustic soda dissolved in 15 cc. of water were added thereto. Then 32.6 g. of powdered iodine were added thereto over 30 minutes under stirring at 7 to 10° C. After the addition the solution was stirred for 1 hour at the same temperature. Then the methanol was distilled away under a reduced pressure, and 100 cc. of water were added to form a light brown oily substance, which was extracted with ether and was dried with dehydrated sodium sulfate. Then the ether was distilled away and the residue was distilled under a reduced pressure to obtain metacresyl 3-iodopropargyl formal (B.P. 121–128° C./0.3 mm. Hg) in the form of slightly orange oil. The yield was 22.5 g.

Various other compounds obtained in the same manner as in the above mentioned examples are enumerated below together with their boiling points, melting points and solvents from which the recrystallization was conducted.

4-chlorophenyl 3-iodopropargyl formal—B.P. 115 to 116° C./0.2 mm. Hg.
2,4-dichlorophenyl 3-iodopropargyl formal—M.P. 48.5 to 50° C. (n-hexane)
2,4,5-trichlorophenyl 3-iodopropargyl formal—M.P. 93 to 95° C. (n-hexane)
Pentachlorophenyl 3-iodopropargyl formal—M.P. 132 to 134° C. (methyl isobutyl ketone)
β-Naphthyl 3-iodopropargyl formal—M.P. 43 to 44.5° C. (methanol)
8-quinolyl 3-iodopropargyl formal—M.P. 117.5 to 121° C. (decomposed) (methanol)

The iodized formal compounds of the general Formula I of this invention have excellent bacteriocidal and fungicidal activities, and therefore are useful as bacteriocidal and fungicidal agents for various uses.

The bacteriocidal and fungicidal agent of the present invention is thus characterized by comprising one or more of the compounds represented by the above general Formula I as active ingredient. The bactericidal and fungicidal agent may also contain one or more of any other bactericides and/or fungicides. The agent may take any form suitable for the particular use. Thus, for example, the active component may be dissolved or dispersed in a proper solvent, or may be mixed with a proper solid filler. It is also possible to add an emulsifying agent, dispersing agent, suspending agent or stabilizing agent.

The bactericidal or fungicidal agent of the present invention is useful as a bactericidal, antiseptic, antifungal agent for fibers, paints, wood, pastes, paper and slim inhibition. It is also useful for medical application.

Experiment 1

The bactericidal and fungicidal spectra of paranitrophenyl 3-iodopropargyl formal

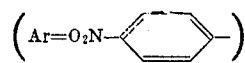

metacresyl 3-iodopropargyl formal

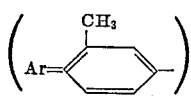

β-naphthyl 3-iodopropargyl formal

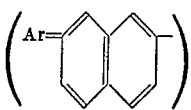

and 8-quinolyl 3-iodopropargyl formal

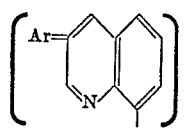

as compared with those of phenyl mercury acetate (PMA) are as in Table I.

Experiment 2

The bactericidal and fungicidal spectra of parachlorophenyl 3-iodopropargyl formal

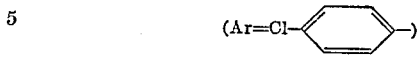

2,4-dichlorophenyl 3-iodopropargyl formal

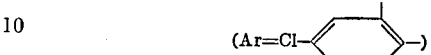

and 2,4,5-trichlorophenyl 3-iodopropargyl formal

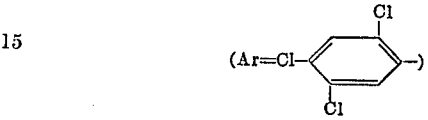

are as in Table II.

TABLE II

[Minimum growth inhibiting concentration (p.p.m.)]

| Agent | Aspergillus niger | Penicilum luteum | Bacillus subtilis | Escherichia coli |
|---|---|---|---|---|
| Ar=Cl-⌬- | 0.33 | 0.125 | 10.0 | 20.0 |
| Ar=Cl-⌬-Cl | 0.83 | 0.83 | 5.0 | 4.0 |
| Ar=Cl-⌬(Cl)(Cl) | 2.5 | 5.0 | 2.5 | >100.0 |

TABLE I

[Minimum growth inhibiting concentration (p.p.m.)]

| Agent | Aspergillus niger | Penicilum luteum | Bacillus subtilis | Escherichia coli |
|---|---|---|---|---|
| Ar=O₂N-⌬- | <2.5 | <2.5 | >100.0 | >100.0 |
| Ar=(CH₃)⌬- | 0.5 | 1.67 | 20.0 | 40.0 |
| Ar=naphthyl | 1.67 | >20.0 | 5.0 | 20.0 |
| Ar=quinolyl | 2.5 | 5.0 | 40.0 | 200.0 |
| PMA | 1.67 | 1.0 |  | 0.7 |

EXAMPLE 3

A solution is prepared by mixing 25% metacresyl 3-iodopropargyl formal, 5% of surface active agent (polyoxypropylene alkyl ether) and 70% methanol. This solution, in actual use, may be diluted with water.

EXAMPLE 4

A paste is prepared by mixing 5% parachlorophenyl 3-iodopropargyl formal, 5% of a surface active agent (polyoxyethylene alkylaryl ether) and 90% dextrin. The paste may be diluted with water to be of a proper concentration.

What we claim is:
1. A compound of the formula

$$ArOCH_2OCH_2C{\equiv}CI$$

wherein Ar represents a member selected from the group consisting of phenyl, naphthyl and phenyl or naphthyl substituted by at least one member of the group of alkyl, halogen and nitro.
2. Paranitrophenyl 3-iodopropargyl formal.
3. Metacresyl 3-iodopropargyl formal.
4. Parachlorophenyl 3-iodopropargyl formal.
5. 2,4-dichlorophenyl 3-iodopropargyl formal.
6. 2,4,5-trichlorophenyl 3-iodopropargyl formal.
7. Pentachlorophenyl 3-iodopropargyl formal.
8. β-Naphthyl 3-iodopropargyl formal.

References Cited
UNITED STATES PATENTS 3,322,813  5/1967  Seki et al. _____ 260—613 D UX
3,338,950  8/1967  Seki et al. _____ 260—613 D X BERNARD HELFIN, Primary Examiner U.S. Cl. X.R.

260—289 R, 999; 424—341, 258; 106—15 R